Patented Nov. 28, 1922.

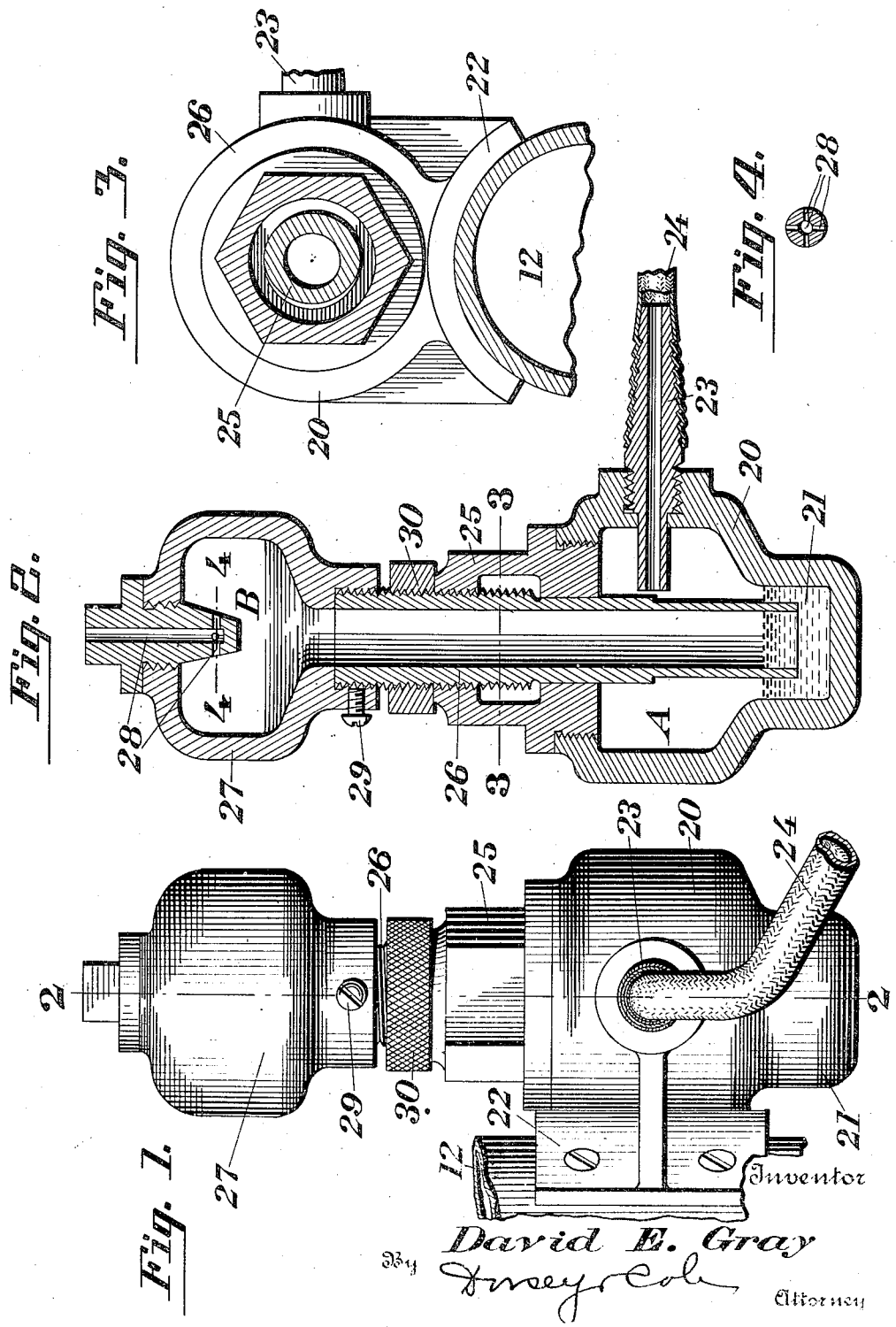

1,437,138

UNITED STATES PATENT OFFICE.

DAVID E. GRAY, OF CORNING, NEW YORK, ASSIGNOR TO THE CORNING GLASS WORKS, OF CORNING, NEW YORK.

AIR-PRESSURE REGULATOR.

Application filed November 19, 1918. Serial No. 263,232.

*To all whom it may concern:*

Be it known that I, DAVID E. GRAY, a citizen of the United States of America, and a resident of the city of Corning and State of New York, have invented certain new and useful Improvements in Air-Pressure Regulators, of which the following is a specification.

This invention relates to an apparatus for regulating the pressure of blowing air used in the manufacture of thin-walled articles of glass, such as electric lamp bulbs.

In the machine production of these articles, difficulty has heretofore been experienced, due to a tendency to mold marking and strain, with the resulting rejection of a large percentage of production, thereby reducing the usable out put of the machines, and my invention seeks to overcome these difficulties by providing a pressure regulator for the blowing air which may be adjusted to give the desired pressure in the bulbs, and to maintain this pressure at a selected value in the blowing of successive bulbs, as I have found that if the blowing pressure be properly selected for the article being made, and for the temperature of the glass at the time of blowing, increased output will be obtained. The object of this invention is to provide a construction of regulator which will accomplish this, and which will be simple and reliable in its action.

In the specific form of the device which I have illustrated, there is provided a chamber designed to contain a quantity of suitable liquid, such as mercury, oil, glycerine, water, etc.. and a tube of relatively large diameter, the lower end of which projects into and below the surface of the liquid, the chamber itself being connected to the blowing air supply. Any excess pressure of the air in the chamber and air supply, forces the liquid up the tube a sufficient distance to uncover the lower end of the tube, and thus permits the escape of air from the chamber.

The pressure at which a blow through the tube will occur is determined by the vertical distance between the top of the liquid in the tube and the bottom of the tube when the level of liquid in the chamber has been depressed (by the air pressure forcing the liquid up the tube) to uncover the bottom of the tube. It is thus dependent on the diameter of the tube, the amount of liquid in the chamber above the level of the lower end of the tube at atmospheric pressure, and the specific gravity of the liquid. A blow through the tube will by the escape of air reduce the blowing pressure to the value determined by the selected values of the above factors.

Blow devices comprising valves held to their seats by springs, gravity, etc., are subject to great irregularity in their action due to variations from time to time, frictional resistance to their movements, etc., and are liable to stick and jam, and are difficult to keep tight. These defects are avoided by the liquid column.

In the accompanying drawings:—

Fig. 1 is an elevation of an air pressure regulator constructed in accordance with my invention, Fig. 2 is a vertical longitudinal section therethrough, taken approximately on the line, 2—2, of Fig. 1, Fig. 3 is a horizontal section, taken approximately on the line 3—3 of Fig. 2, and Fig. 4 is a similar view taken on the line 4—4 of Fig. 2.

The device here described comprises a cup 20, which is provided in its base with a well 21, that serves as the receptacle for the liquid, the interior of the cup forming an air chamber A.

Formed on the exterior of the cup, is a saddle 22, by which the device here described is adapted to be suitably mounted, such for instance on the pipe 12, as the same is shown and marked in Fig. 2 of the Chamberlain Patent No. 1,124,702.

A suitable nipple 23, communicates with the chamber A, above the well 21, and to it is attached the pipe 24 leading from the blowing air supply. In the machine shown in the patent above referred to, this would be from the bellows 153.

A cap 25 is screwed into the top of the cup 20, and the tube 26 is adjustably mounted therein, as by threading within the cap. The lower end of the tube projects into the well 21, of the cup, and its upper threaded end projects above the cap.

Another cup 27, having suitable vents 28 formed in its upper surface is fixedly secured, as by means of the set screw 29, to the upper end of the tube. This cup forms a supplemental chamber B, and, should during the operation of the device, any particles of liquid be blown up the tube, they will collect in the chamber B, and fall back into the tube. By preference, the vents 28 which are formed in a plug arranged in alinement with the tube are constructed as shown, so as to permit the air as it passes up the tube to readily escape, and prevent the escape of any liquid.

To secure adjustment of the blow off pressure, it is desirable to adjust the amount the tube 26 extends into the liquid. With this in view, the cup 27, may be grasped in the hand and revolved to either raise or lower the end of the tube with respect to the level of the liquid in the well. When the proper position of the tube and the liquid has been obtained, the lock-nut 30, on the tube 26, between cup 27 and cap 25, is screwed down tightly on the latter and the tube thus locked in adjusted position.

In the operation of the device the air admitted through the nipple 23, to the chamber A, forces the liquid contained in the well 21, into the tube 26, until the level in the well is lower than the lower end of the tube. The air then bubbles up through the liquid in the tube and enters the upper chamber B, from where it escapes through the vents 28.

In actual practice mercury has been found to possess the most suitable qualities for the purpose for which my device is designed, inasmuch as its weight permits the construction of a small device which will operate satisfactorily, and because it is not so readily atomized as the other liquids, and if atomized its particles are so heavy that they do not float in the air, but fall to the bottom of the upper chamber where they combine, forming larger drops, and run down in the tube.

It is to be noted that the diameter of the tube 26, into which the liquid is forced by the pressure is relatively great. It can readily be understood, that if it were of small diameter, all the mercury which had been forced into the tube would be lifted on a blow out, into the upper chamber B. If such occurred, the pressure would immediately be reduced as soon as the mercury began to enter the upper chamber, as the column would become shortened. With the large diameter of tube the mercury is forced up into it, but ceases to rise as soon as the level thereof in the well 21, reaches a point slightly below the lower end of the tube, and permits the air to bubble up through the mercury in the tube. Only small particles of mercury reach the upper chamber. These are thrown off by the bursting of the bubbles in the tube and they immediately run back down the inclined bottom thereof.

Hence, if this device is used for the purpose of controlling the pressure of air, where the excess is considerable, or the fluctuation very great, it will be necessary to use a tube of larger diameter. In other words, the minimum diameter of the tube, is somewhat dependent upon the amount of air and the fluctuation thereof, which the device is to handle.

Inasmuch as the part 12 of the Patent 1,124,702, to which the device herein shown is, by preference applied, is at times in a horizontal and at other times in a vertical position (it not being necessary to regulate the air pressure while the device is in the former position), I cause the nipple 23 to project well within the chamber A, and make the upper chamber B of such capacity that when the device is placed in horizontal position, and the liquid flows out of the well and around the nipple, and also some liquid flows through the tube 26 to the chamber B, the end of such nipple and the central ports 28 in the chamber B will be above the level of the liquid to prevent escape thereof.

Having thus described my invention, what I claim is:—

1. An air-pressure regulator comprising a lower chamber, an upper chamber, a tube connecting the said chambers, a liquid in the lower chamber normally sealing the lower end of the tube, a plug arranged in the upper chamber in alinement with the tube, and having a vent, said vent opening into the upper chamber at a distance from the upper wall thereof and at an angle to the axis of the tube whereby to prevent the escape of liquid from the upper chamber.

2. An air-pressure regulator including a pressure chamber, an air chamber, a liquid in the pressure chamber, a tube connecting the air chamber and pressure chamber, inlet means for the pressure chamber, communicating with the pressure chamber at a point so disposed that the liquid in the pressure chamber may not enter the inlet, no matter at what position the regulator may be placed, and an outlet for the air chamber, communicating with the upper chamber at a point so disposed that the liquid cannot enter the outlet, no matter at what position the regulator may be placed.

3. An air-pressure regulator including a lower chamber having a well formed therein, a liquid contained in the well, an upper chamber, a tube communicating with the upper chamber and extending into the liquid in the well, and an inlet for the chamber communicating therewith at a point so disposed in the chamber that the liquid cannot escape through the inlet, irrespective of the position of the chamber.

4. An air pressure regulator comprising an inlet chamber containing a liquid, an outlet chamber, communicating means between the chambers, and air-outlet means in the outlet chamber for allowing the escape of air and for preventing the loss of liquid from the outlet chamber, irrespective of the position thereof.

In testimony whereof I have hereunto signed my name this 14th day of November, 1918.

DAVID E. GRAY.